(12) United States Patent
Nie et al.

(10) Patent No.: US 11,567,467 B2
(45) Date of Patent: Jan. 31, 2023

(54) METHOD AND SYSTEMS FOR CONFIGURING A MODULAR BUILDING CONTROL SYSTEM

(71) Applicant: Honeywell International Inc., Morris Plains, NJ (US)

(72) Inventors: Rong Bao Nie, Morris, NJ (US); Himanshu Khurana, Excelsior, MN (US); Jared P. Faber, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 320 days.

(21) Appl. No.: 16/888,558

(22) Filed: May 29, 2020

(65) Prior Publication Data
US 2021/0373515 A1 Dec. 2, 2021

(51) Int. Cl.
*G05B 19/042* (2006.01)
(52) U.S. Cl.
CPC .. *G05B 19/042* (2013.01); *G05B 2219/25011* (2013.01); *G05B 2219/2614* (2013.01)
(58) Field of Classification Search
CPC .................................................. G05B 19/042
USPC ........................................................ 700/276
See application file for complete search history.

(56) References Cited

U.S. PATENT DOCUMENTS

| | | |
|---|---|---|
| 5,277,036 A | 1/1994 | Dieckmann et al. |
| 6,820,809 B2 | 11/2004 | Juntunen et al. |
| 9,435,557 B2 | 9/2016 | Albrecht et al. |
| 10,119,720 B2 | 11/2018 | Choi et al. |
| 2008/0320582 A1* | 12/2008 | Chen .................. H04L 63/0245 726/13 |
| 2010/0076605 A1* | 3/2010 | Harrod ............... G05D 23/1905 700/276 |

(Continued)

FOREIGN PATENT DOCUMENTS

| | | | |
|---|---|---|---|
| WO | 2018029518 A1 | 2/2018 | |
| WO | WO-2018029518 A1 * | 2/2018 | ......... G05B 19/0426 |

OTHER PUBLICATIONS

Extended European Search Report, EP Application No. 21173105.4, dated Oct. 19, 2021 (8 pages).

*Primary Examiner* — Mohammad Ali
*Assistant Examiner* — Joshua T Sanders
(74) *Attorney, Agent, or Firm* — Seager, Tufte & Wickhem, LLP (57) ABSTRACT

Methods and systems for configuring a modular building control system. An illustrative method may include entering a configuration mode in a base module and in each of the expansion modules. While in the configuration mode, the base module may collect information from each of the expansion modules. A system configuration may be created for the modular building control system based at least in part on the collected information and includes configuration parameters for the base module and each of the expansion modules. The base module may transmit to each of the expansion modules their respective configuration parameters. The base module and each of the expansion modules may install their respective configuration parameters, exit the configuration mode, and enter an operation mode. While in the operation mode, the base module and each of the expansion modules may control the modular building control system.

20 Claims, 3 Drawing Sheets

(56) References Cited

U.S. PATENT DOCUMENTS

| | | |
|---|---|---|
| 2010/0298985 A1 | 11/2010 | Hess et al. |
| 2014/0207289 A1 | 7/2014 | Golden et al. |
| 2015/0077087 A1 | 3/2015 | Romney |
| 2016/0010888 A1 | 1/2016 | Groskreutz et al. |
| 2017/0097619 A1* | 4/2017 | Welingkar ............ H04L 67/125 |
| 2017/0279876 A1* | 9/2017 | Prasad ................ H04L 67/1001 |
| 2018/0052429 A1* | 2/2018 | Ryan ...................... G05B 11/01 |

\* cited by examiner

METHOD AND SYSTEMS FOR CONFIGURING A MODULAR BUILDING CONTROL SYSTEM

TECHNICAL FIELD

The disclosure generally relates to building control systems, and more particularly to systems and methods for configuring modular building control system.

BACKGROUND

Due to the varying needs of differing buildings, the selection, installation and configuration of building components of a building control system such as a heating, ventilation, and air conditioning (HVAC) system, security system, lighting system and/or other building control systems can be time consuming and expensive. What would be desirable are methods and systems that help streamline this process.

SUMMARY

This disclosure generally relates to building management systems, and more particularly to systems and methods for configuring and deploying a module building control system. In one example, a method for configuring a modular building control system that includes a base module and one or more expansion modules may include entering a configuration mode in the base module and in each of the one or more expansion modules. The base module may be in operative communication with each of the one or more expansion modules. While in the configuration mode, the base module may collect information from each of the one or more expansion modules and create a system configuration for the modular building control system based at least in part on the collected information. The created system configuration may include configuration parameters for the base module and each of the one or more expansion modules. The base module may transmit to each of the one or more expansion modules their respective configuration parameters. The base module and each of the one or more expansion modules may install their respective configuration parameters. The base module and each of the one or more expansion modules may exit their configuration mode and enter an operation mode. While in the operation mode, the base module and each of the one or more expansion modules may control the modular building control system.

In some cases, the method may further include checking a compatibility of the base module and each of the one or more expansion modules and providing an alert when an incompatibility is detected.

In some cases, collecting information from the base module and each of the one or more expansion modules may include collecting technical parameters of each of the one or more expansion modules.

In some cases, the technical parameters may include one or more of an expansion module product identification, an expansion module function list, and/or an expansion module function interface.

In some cases, collecting information from the base module and each of the one or more expansion modules may include collecting functional parameters of each of the one or more expansion modules.

In some cases, the functional parameters may include one or more of an IP address of an expansion module, a physical location of an expansion module, and/or a sensor reading.

In some cases, creating the system configuration may be performed at least in part by the base module.

In some cases, the method may further include transmitting the collected information from the base module to a cloud server and creating the system configuration may be performed at least in part by the cloud server.

In some cases, the modular building control system may include a Heating, Ventilation, and Air Conditioning (HVAC) system.

In some cases, the modular building control system may include a security system.

In some cases, at least some of the collected information may be manually entered by a user.

In some cases, at least some of the collected information may be automatically collected by the base module.

In another example, a system for configuring a modular building control system of a building may include a base module including a controller, a memory, and a communications interface and one or more expansion modules in communication with the base module. The one or more expansion modules may be configured to interface with one or components of the modular building control system. The controller of the base module may be configured to enter a configuration mode. Once in the configuration mode the controller may be configured to collect information from each of the one or more expansion modules, store configuration parameters for the base module and each of the one or more expansion modules that are based on the information collected from the one or more expansion modules, transmit to each of the one or more expansion modules their respective configuration parameters for installation on each of the one or more expansion modules, install the configuration parameters for the base module on the base module, and exit the configuration mode and enter an operational mode. Once in the operational mode, the controller of the base module may control the modular building control system in conjunction with the one or more expansion modules.

In some cases, the controller of the base module is configured to check a compatibility of the base module and each of the one or more expansion modules and provide an alert when an incompatibility is detected.

In some cases, the controller of the base module may be configured to send a command to each of the one or more expansion modules to place each of the one or more expansion modules in a configuration mode before collecting information from each of the one or more expansion modules.

In some cases, the controller of the base module may be configured to send a command to each of the one or more expansion modules to place each of the one or more expansion modules in an operation mode before controlling the modular building control system in conjunction with the one or more expansion modules.

In some cases, the collected information may include at least one parameter from each of the one or more expansion modules, wherein the at least one parameter includes one or more of a product identification, a function list, a function interface, an IP address, a location, and/or a sensor reading.

In some cases, the controller of the base module may be configured to transmit at least some of the collected information from the base module to a cloud server, and to receive at least in part of the configuration parameters from the cloud server.

In another example, a system for configuring a modular building control system of a building may include a base module including a controller, a memory, and one or more communications interfaces, one or more expansion modules in communication with the base module, the one or more expansion modules configured to interface with one or more components of the modular building control system, and a cloud server in communication with the base module. The controller of the base module may be configured to collect information from the base module and the one or more expansion modules and transmit at least some of the collected information to the cloud server. Upon receipt of the information from the base module, the cloud server may be configured to create a system configuration for the modular building control system using the information collected from the base module and the one or more expansion modules and to transmit the system configuration to the base module. The system configuration may include configuration parameters for the base module and each of the one or more expansion modules. The controller of the base module may be configured to transmit to each of the one or more expansion modules their respective configuration parameters and to install the configuration parameters for the base module on the base module. Each of the one or more expansion modules may be configured to install their respective configuration parameters. Once the base module and each of the one or more expansion modules have installed their respective configuration parameters, the controller of the base module may be configured to control the modular building control system in conjunction with the one or more expansion modules.

In some cases, the cloud server may be further configured to check a compatibility of the base module and each of the one or more expansion modules and provide an alert when an incompatibility is detected.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

When purchasing a building management system, such as, but not limited to a Heating, Ventilation, and Air Conditioning (HVAC) system or a security system, each purchaser or customer may have varying needs. For example, each customer may have a unique building size and/or configuration that results in different types of devices, control systems, arrangements, etc. of the building management system. Once each system has been purchased, it needs to be installed and configured in the building in which it operates. Depending on the size of the system and the number of components, this installation and configuration may take up to five days, or more. What would be desirable is to reduce the amount of time and cost associated with the installation and configuration of a building management system. In some cases, a building management system may be referred to as a building control system.

Figure 1:
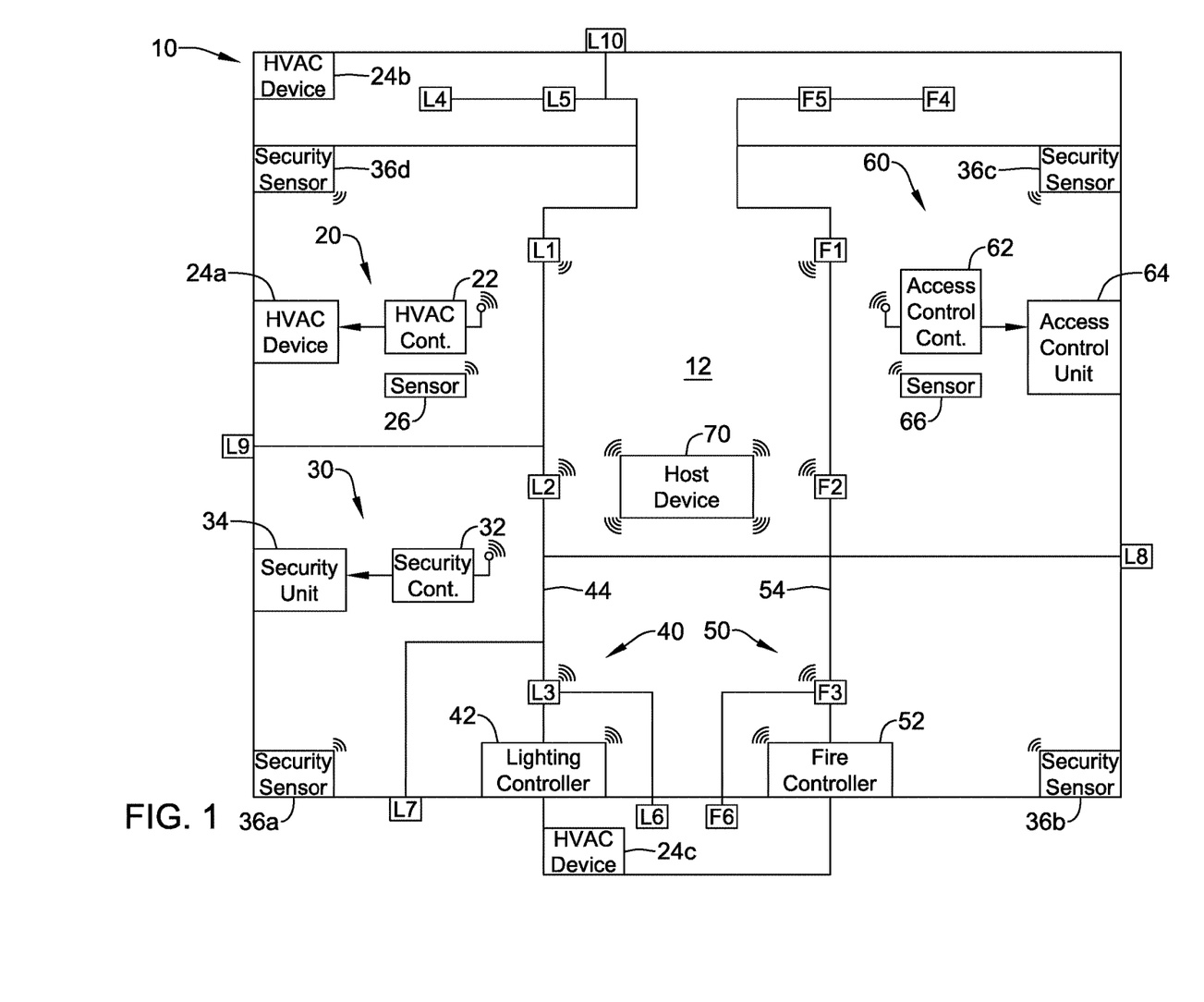
FIG. 1 is a schematic view of an illustrative building or other structure that includes a building management system (BMS) that controls building control components servicing the building.

FIG. 1 is a schematic view of an illustrative building or structure 10 that includes an illustrative building management system (BMS) 12 for controlling one or more building control components servicing the building or structure 10. The BMS 12, as described herein according to the various illustrative embodiments, may be used to control the one or more building control components in order to control certain environmental conditions (e.g., temperature, ventilation, humidity, lighting, etc.). Such a BMS 12 may be implemented in, for example, office buildings, factories, manufacturing facilities, distribution facilities, retail buildings, hospitals, health clubs, movie theaters, restaurants, and even residential homes.

The illustrative BMS 12 shown in FIG. 1 includes a heating, ventilation, and air conditioning (HVAC) system 20, a security system 30, a lighting system 40, a fire system 50, and an access control system 60. These are just a few examples of systems that may be included or controlled by the BMS 12. In some cases, the BMS 12 may include more or fewer systems depending on the application. For example, some buildings may include refrigeration systems or coolers. In some cases, each system may include a one or more controllers configured to provide one or more control signals for controlling building control components and/or devices of the BMS 12.

One or more of the systems 20, 30, 40, 50, 60 may be a modular system that includes a base module and at least one expansion module. The base module may include the system control device or a master device in communication with the at least one expansion module. In some cases, the base module may be configured to also connect directly to one more control devices and/or sensors. In some cases, the expansion modules may be controllers or a combination of controllers and sensors. In some cases, one or more of the expansion modules may be an I/O module that includes wiring terminals for accepting wiring connection to building control devices such as dampers, thermostats, sensors, furnaces, boilers, VAV boxes, access control devices, audible alarms, and/or any other suitably building control devices as desired. The base module and/or the expansion modules may be configured to receive information from and/or provide control commands to control the one or more building control components of the system(s) 20, 30, 40, 50, 60. An installer may select an appropriate base module and appropriate expansion modules to satisfy the needs of a particular building. This module nature of the illustrative building control system allows significant flexibility in mixing and matching a base module with expansion modules to achieve the needs of a particular building. However, configuring such mix and matched modular systems can be difficult and time consuming.

In some cases, the HVAC system 20 may include an HVAC control device as a base module 22 used to communicate with one or more expansion modules 24a, 24b, and 24c (collectively, 24), for controlling one or more HVAC components to service the HVAC needs of the building or structure 10. While the HVAC system 20 is illustrated as including three devices or expansion modules, it should be understood that the structure may include fewer than three or more than three devices 24 or expansion modules, as desired. Some illustrative building components may include, but are not limited to a furnace, a heat pump, an electric heat pump, a geothermal heat pump, an electric heating unit, an air conditioning unit, a roof top unit, a humidifier, a dehumidifier, an air exchanger, an air cleaner, a damper, a valve, blowers, fans, motors, and/or the like. It is contemplated that one or more expansion modules may be a part of one or more of the HVAC components.

The HVAC system 20 may further include a system of ductwork and air vents (not explicitly shown). The HVAC system 20 may further include one or more sensors or devices 26 configured to measure parameters of the environment to be controlled. The HVAC system 20 may include more than one sensor or device of each type, as needed to control the system. It is contemplated that large buildings, such as, but not limited to an office building, may include a plurality of different sensors in each room or within certain types of rooms or zones. The one or more sensors or devices 26 may include, but are not limited to, temperatures sensors, humidity sensors, carbon dioxide sensors, pressure sensors, occupancy sensors, proximity sensors, etc. In some cases, the sensors/devices 26 are operatively connected to the base module 22 via one or more expansion module 24, where the expansion modules are operatively coupled to the base module. In some instances, one or more of sensor/devices 26 may be operatively connected to directly the base module 22, but this is not required.

In some cases, the security system 30 may include a security control device as a base module 32 used to communicate with one or more expansion modules 34 for monitoring and controlling one or more security units of the building or structure 10. The security system 30 may include a number of sensors/devices 36a, 36b, 36c, 36d (collectively, 36). The sensor/devices 36 may be configured to detect threats within and/or around the building 10. In some cases, some of the sensor/devices 36 may be constructed to detect different threats. For example, some of the sensor/devices 36 may be limit switches located on doors and windows of the building 10, which are activated by entry of an intruder into the building 10 through the doors and windows. Other suitable security sensor/devices 36 may include fire, smoke, water, carbon monoxide, and/or natural gas detectors, to name a few. Still other suitable security system sensor/devices 36 may include motion sensors that detect motion of intruders in the building 10, noise sensors or microphones that detect the sound of breaking glass, security card pass systems, or electronic locks, etc. It is contemplated that the motion sensor may be a passive infrared (PIR) motion sensor, a microwave motion sensor, an ultrasonic motion sensor, a tomographic motion sensor, a video camera having motion detection software, a vibrational motion sensor, etc. In some cases, one or more of the sensor/devices 36 may include a video camera. In some cases, the sensor/devices 36 may include a horn or alarm, a damper actuator controller (e.g., that closes a damper during a fire event), a light controller for automatically turning on/off lights to simulate occupancy, and/or any other suitable device/sensor. These are just examples.

In some cases, the lighting system 40 may include a lighting control device as a base module 42 used to communicate with and control one or more expansion modules 44 having lighting units L1-L10 for servicing the building or structure 10. In some embodiments, one or more of the lighting units L1-L10 may be configured to provide visual illumination (e.g., in the visible spectrum) and one or more of the light units L1-L10 may be configured to provide ultraviolet (UV) light to provide irradiation. The lighting system 40 may include emergency lights, outlets, lighting, exterior lights, drapes, and general load switching, some of which are subject to "dimming" control which varies the amount of power delivered to the various building control devices.

In some cases, the fire system 50 may include a fire control device as a base module 52 used to communicate with and control one or more expansion modules 54 having fire units F1-F6 for monitoring and servicing the building or structure 10. The fire system 50 may include smoke/heat sensors, a sprinkler system, warning lights, and so forth. In some cases, the access control system 60 may include an access control device as a base module 62 used to communicate with and control one or more expansion modules 64 for allowing access in, out, and/or around the building or structure 10. The access control system 60 may include doors, door locks, windows, window locks, turnstiles, parking gates, elevators, or other physical barriers, where granting access can be electronically controlled. In some embodiments, the access control system 60 may include one or more sensors 66 (e.g., RFID, etc.) configured to allow access to the building or certain parts of the building 10.

In a simplified example, the BMS 12 may be used to control a single HVAC system 20, a single security system 30, a single lighting system 40, a single fire system 50, and/or a single access control system 60. In other embodiments, the BMS 12 may be used to communicate with and control multiple discrete building control devices 22, 32, 42, 52, and 62 of multiple systems 20, 30, 40, 50, 60. The devices, units, and controllers of the systems 20, 30, 40, 50, 60 may be located in different zones and rooms, such as a common space area (a lobby, a break room, etc.), in a dedicated space (e.g., offices, work rooms, etc.) or outside of the building 10. In some cases, the systems 20, 30, 40, 50, 60 may be powered by line voltage, and may be powered by the same or different electrical circuit. It is contemplated that the BMS 12 may be used to control other suitable building control components that may be used to service the building or structure 10.

In some embodiments, the BMS 12 may include a host device 70 that may be configured to communicate with the discrete systems 20, 30, 40, 50, 60 of the BMS 12. In some cases, the host device 70 may be configured with an application program that assigns devices of the discrete systems to a particular device (entity) class (e.g., common space device, dedicated space device, outdoor lighting, unitary controller, and so on). In some cases, there may be multiple hosts. For instance, in some examples, the host device 70 may be one or many of the control devices 22, 32, 42, 52, 62. In some cases, the host device 70 may be a hub located external to the building 10 at an external or remote server also referred to as "the cloud."

In some cases, the building control devices or base modules 22, 32, 42, 52, 62 may be configured to transmit a command signal to its corresponding building control component(s) for activating or deactivating the building control component(s) in a desired manner. In some cases, base modules 22, 32, 42, 52, 62 may be configured to receive a classification of the building control component and may transmit a corresponding command signal(s) to their respective building control component, sometimes via an expansion module, in consideration of the classification and location of the building control component.

In some instances, the building control devices 22, 32, 62 (e.g. base modules) may be configured to receive sensor signals from one or more expansion modules 24, 34, 64 that are connected to sensors 26, 36, 66 located throughout the building or structure 10. In some cases, the building control devices 42 and 52 (e.g. base modules) may be configured to receive signals from one or more sensors operatively and/or communicatively coupled with the lighting units L1-L10 and the fire units F1-F6 located throughout the building or structure 10, respectively. The building control devices 22, 32, 42, 52, 62 (e.g. base modules) and the host device 70 may be configured to use signal(s) received from the one or more sensors to operate or coordinate operation of the various BMS systems 20, 30, 40, 50, 60 located throughout the building or structure 10.

The one or more sensors 26, 36, 66, L1-L10, and F1-F6 may be any one of a temperature sensor, a humidity sensor, an occupancy sensor, a pressure sensor, a flow sensor, a light sensor, a video camera, a current sensor, a smoke sensor and/or any other suitable sensor. In one example, at least one of the sensors 26, 36, 66, or other sensors, may be an occupancy sensor. The building control devices 22, 32, 42, 62 and/or the host device 70 may receive a signal from the occupancy sensor indicative of occupancy within a room or zone of the building or structure 10. In response, the building control devices 22, 32, 42, and/or 62 may send a command to activate one or more building control component(s) located in or servicing the room or zone where occupancy is sensed, sometimes through an expansion module connected to the desired building control component(s).

Likewise, in some cases, at least one of the sensors 26 may be a temperature sensor configured to send a signal indicative of the current temperature in a room or zone of the building or structure 10. The building control device 22 may receive the signal indicative of the current temperature from a temperature sensor 26. In response, the building control device 22, which may be considered a base module of the HVAC system, may send a command to an HVAC device 24, sometimes through an expansion module, to activate and/or deactivate the HVAC device 24 that is in or is servicing that room or zone to regulate the temperature in accordance with a desired temperature set point.

In yet another example, one or more of the sensors may be a current sensor. The current sensor may be coupled to the one or more building control components and/or an electrical circuit providing electrical power to one or more building control components. The current sensors may be configured to send a signal to a corresponding building control device, which indicates an increase or decrease in electrical current associated with the operation of the building control component. This signal may be used to provide confirmation that a command transmitted by a building control device has been successfully received and acted upon by the building control component(s). These are just a few examples of the configuration of the BMS 12 and the communication that can take place between the sensors and the control devices.

Figure 2:
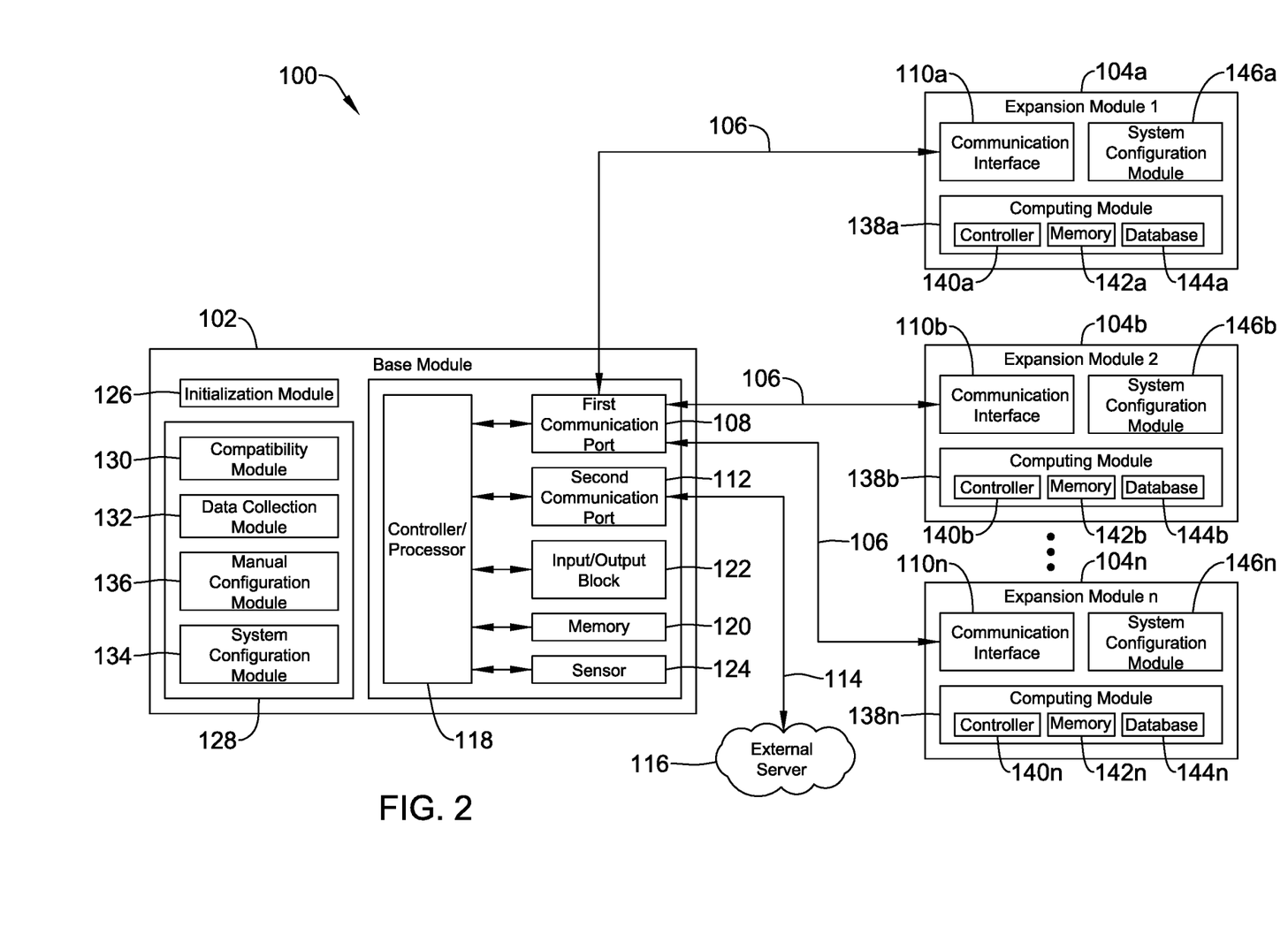
FIG. 2 is a schematic block diagram of an illustrative base controller and one or more expansion controllers of an illustrative BMS system.

FIG. 2 illustrates a schematic block diagram of an illustrative modular control system 100. The modular control system 100 can control one or more of an HVAC system, a security system, a lighting system, a fire system, a building access system and/or any other suitable building control system as desired. The modular control system 100 may include at least a base module 102 and one or more expansion modules 104a, 204b, 104n (collectively, 104). The base module 102 may be a master control device. For example, the base module 102 controller may include control circuitry and logic configured to operate, control, command, etc. the various components (not explicitly shown) of the control system 100. In some cases, the controller may provide these instructions to expansion modules 104 which in turn may relay or otherwise provide control commands to the components of the system. In some instances, the components of the system may provide information related to the system, such as sensor readings, environmental conditions, etc. to the expansion module 104 which in turn may relay some or all of this information to the base module 102.

The base module 102 may include any number of expansion modules 104 as desired, such as, but not limited to, one, two, three, four, or more. It is contemplated that the number of expansion modules 104 may be dependent on the desired size and/or function of the modular control system 100. The expansion modules 104 may be selected and configured to control differing aspects of the modular control system 100. For example, in the case where the modular control system 100 is an HVAC system, a first expansion module 104a may control one or more air conditioning units while a second expansion module 104b may control one or more fans or blowers. This is just one example and is not intended to be limiting. While each expansion module 104 may be configured to communicate with and/or control different aspects or components of the modular control system 100, the expansion modules 104 may include similar features, as will be described in more detail herein.

The base module 102 may be configured to communicate with the expansion modules 104 over a first network 106, including a local area network (LAN) or a wide area network (WAN), or the connection may be made to an external computer (for example, through the Internet using an Internet Service Provider). Such communication can occur via a first communication port 108 at the base module 102 and a communication interface 110a, 110b, 110n (collectively, 110) at the expansion modules 104. The first communications port 108 of the base module 102 and/or the communication interfaces 110 of the expansion modules 104 can be a wireless communications port including a wireless transceiver for wirelessly sending and/or receiving signals over a wireless network 106. However, this is not required. In some cases, the first network 106 may be a wired network or combinations of a wired and a wireless network.

The base module 102 may include a second communications port 112 which may be a wireless communications port including a wireless transceiver for sending and/or receiving signals over a second wireless network 114. However, this is not required. In some cases, the second network 114 may be a wired network or combinations of a wired and a wireless network. In some embodiments, the second communications port 112 may be in communication with a wired or wireless router or gateway for connecting to the second network 114, but this is not required. When so provided, the router or gateway may be integral to (e.g., within) the base module 102 or may be provided as a separate device. The second network 114 may be a wide area network or global network (WAN) including, for example, the Internet. The base module 102 may communicate over the second network 114 with an external web service hosted by one or more external web servers 116 (e.g. the cloud).

The base module 102 may include a processor 118 (e.g., microprocessor, microcontroller, etc.) and a memory 120. While not explicitly shown, in some cases, the base module 102 may include a user interface including a display and a means for receiving user input (e.g., touch screens, buttons, keyboards, etc.). The memory 120 may be in communication with the processor 118. The memory 120 may be used to store any desired information such as, but not limited to, control algorithms, configuration protocols, set points, schedule times, diagnostic limits such as, for example, differential pressure limits, delta T limits, security system arming modes, and the like. The memory 120 may be any suitable type of storage device including, but not limited to, RAM, ROM, EPROM, flash memory, a hard drive, and/or the like. In some cases, the processor 118 may store information within the memory 120, and may subsequently retrieve the stored information from the memory 120.

In some embodiments, the base module 102 may include an input/output block (I/O block) 122 having a number of wire terminals for receiving one or more signals from the expansion modules 104 and/or system components and/or for providing one or more control signals to the expansion modules 104 and/or system components. For example, the I/O block 122 may communicate with one or more components of the modular control system 100, including, but not limited to the expansion modules. The base module 102 may have any number of wire terminals for accepting a connection from one or more components of the modular control system 100. However, how many wire terminals are utilized and which terminals are wired is dependent upon the particular configuration of the modular control system 100. Different modular control system 100 having different components and/or types of components may have different wiring configurations. In some cases, the I/O block 122 may be configured to receive wireless signals from the expansion modules 104 and/or one or more components or sensors (not explicitly shown). Alternatively, or in addition to, the I/O block 122 may communicate with another controller, which is in communication with one or more components of the modular control system 100, such as a zone control panel in a zoned HVAC system, equipment interface module (EIM) or any other suitable building control device. It is further contemplated that the I/O block 122 may communicate with another controller which controls a separate building control system, such as, but not limited to a security system base module.

In some cases, a power-transformation block (not explicitly shown) may be connected to one or more wires of the I/O block 122, and may be configured to bleed or steal energy from the one or more wires of the I/O block 122. The power bled off of the one or more wires of the I/O block may be stored in an energy storage device (not explicitly shown) that may be used to at least partially power the base module 102. In some cases, the energy storage device may be capacitor or a rechargeable battery. In addition, the base module 102 may also include a back-up source of energy such as, for example, a battery that may be used to supplement power supplied to the base module 102 when the amount of available power stored by the energy storage device is less than optimal or is insufficient to power certain applications. Certain applications or functions performed by the base module may require a greater amount of energy than others. If there is an insufficient amount of energy stored in the energy storage device then, in some cases, certain applications and/or functions may be prohibited by the processor 118.

The base module 102 may also include one or more sensors such as, but not limited to, a temperature sensor, a humidity sensor, an occupancy sensor, a proximity sensor, and/or the like. In some cases, the base module 102 may include an internal temperature sensor, but this is not required. The base module 102 may also communicate with one or more remote temperature sensors, humidity sensors, and/or occupancy sensors located throughout the building or structure. Additionally, the base module 102 may communicate with a temperature sensor and/or humidity sensor located outside of the building or structure for sensing an outdoor temperature and/or humidity if desired.

The user interface, when provided, may be any suitable user interface that permits the base module 102 to display and/or solicit information, as well as accept one or more user interactions with the base module 102. For example, the user interface may permit a user to locally enter data such as temperature set points, humidity set points, starting times, ending times, schedule times, diagnostic limits, responses to alerts, associate sensors to alarming modes, and the like. In one example, the user interface may be a physical user interface that is accessible at the base module 102, and may include a display and/or a distinct keypad. The display may be any suitable display. In some instances, a display may include or may be a liquid crystal display (LCD), and in some cases an e-ink display, fixed segment display, or a dot matrix LCD display. In other cases, the user interface may be a touch screen LCD panel that functions as both display and keypad. The touch screen LCD panel may be adapted to solicit values for a number of operating parameters and/or to receive such values, but this is not required. In still other cases, the user interface may be a dynamic graphical user interface.

In some instances, the user interface need not be physically accessible to a user at the base module 102. Instead, the user interface may be a virtual user interface that is accessible via the first network 106 and/or second network 114 using a mobile wireless device such as a smart phone, tablet, e-reader, laptop computer, personal computer, key fob, or the like. In some cases, the virtual user interface may be provided by an app or apps executed by a user's remote device for the purposes of remotely interacting with the base module 102. Through the virtual user interface provided by the app on the user's remote device, the user may change temperature set points, humidity set points, starting times, ending times, schedule times, diagnostic limits, respond to alerts, update their user profile, view energy usage data, arm or disarm the security system, configured the alarm system, and/or the like. In some instances, changes made to the base module 102 via a user interface provided by an app on the user's remote device may be first transmitted to an external web server 116. The external web server 116 may receive and accept the user inputs entered via the virtual user interface provided by the app on the user's remote device, and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server 116 may update the control algorithm, as applicable, and transmit at least a portion of the updated control algorithm over the second network 114 to the base module 102 where it is received via the second port 112 and may be stored in the memory 120 for execution by the processor 118. In some cases, the user may observe the effect of their inputs at the base module 102.

Rather than a dedicated app, the virtual user interface may include one or more web pages that are transmitted over the second network 114 (e.g. WAN or the Internet) by an external web server (e.g., web server 116). The one or more web pages forming the virtual user interface may be hosted by an external web service and associated with a user account having one or more user profiles. The external web server 116 may receive and accept user inputs entered via the virtual user interface and associate the user inputs with a user's account on the external web service. If the user inputs include changes to the existing control algorithm including any temperature set point changes, humidity set point changes, schedule changes, start and end time changes, window frost protection setting changes, operating mode changes, and/or changes to a user's profile, the external web server 116 may update the control algorithm, as applicable, and transmit at least a portion of the updated control algorithm over the second network 114 to the base module 102 where it is received via the second port 112 and may be stored in the memory 120 for execution by the processor 118. In some cases, the user may observe the effect of their inputs at the base module 102.

In some cases, a user may use either a user interface provided at the base module 102 and/or a virtual user interface as described herein. The two types of user interfaces that may be used to interact with the base module 102 are not mutually exclusive of one another. However, in some cases, a virtual user interface may provide more advanced capabilities to the user. It is further contemplated that a same virtual user interface 82, 83 for both the HVAC controller 22 and the security system controller 38. Further, as described above, the HVAC controller 22 and the security system controller 38 may be formed as a single controller configured to perform the functions of both the HVAC controller 22 and the security system controller 38 from a single device.

The base module 102 may further include an initialization module 126. The initialization module 126 may be a separate portion of the base module 102 (e.g., a distinct processor/memory), although this is not required. The initialization module 126 may be configured to cause the base module 102 to enter a configuration mode upon the receipt of a command. The command may be received from a user via the user interface.

The base module 102 may further include a configuration module 128 which includes instructions that when executed facilitate configuration of the modular control system 100. The configuration module 128 may be a separate portion of the base module 102 (e.g., a distinct processor/memory), although this is not required. The configuration module 128 may include one or more submodules or subroutines configured to facilitate the configuration of the modular control system 100. For example, the configuration module 128 may include a compatibility module 130, a data collection module 132, a system configuration module 134, and/or a manual configuration module 136. These modules 130, 132, 134, 136 may be formed as separate modules or combined in various manner to into a combined module, as desired. In some cases, one or more of the functions provided by the configuration module 128, the compatibility module 130, the data collection module 132, the system configuration module 134, and/or the manual configuration module 136 may be performed at the external cloud server 116, but this is not required.

The compatibility module 130 may be configured to determine a compatibility of the base module 102 and each of the expansion modules 104, as will be described in more detail herein. The data collection module 132 may be configured to collect information from each of the connected expansion modules 104. For example, the data collection module 132 may collect both technical parameters and functional parameters from the expansion modules 104. Technical parameters may include, but are not limited to, an expansion module product identification, an expansion module function list and/or an expansion module function interface. Functional parameters may include, but are not limited to, an IP address of an expansion module, the physical location of an expansion module, and/or a sensor reading. These are just some types of information the base module 102 (and/or cloud server 116) may collect from the expansion modules 104 and are not intended to be limiting. Once the data has been collected from the various connected expansion modules 104, the system configuration module 134 and/or the manual system configuration module 136 may be configured to individually or collectively create a system configuration for the modular control system 100. In some cases, only one of the system configuration module 134 or the manual system configuration module 136 may be provided. It is contemplated that the manual system configuration module 136 may be configured to solicit and receive a manual input from a user while the system configuration module 134 may be configured to receive information automatically (e.g., without user intervention) from the expansion modules 104.

Each expansion module 104 may include a computing module 138a, 138b, 138n (collectively, 138). The computing module 138 may include a controller or processor 140a, 140b, 140n (collectively, 140) (e.g., microprocessor, microcontroller, etc.) and a memory 142a, 142b, 142n (collectively, 142). While not explicitly shown, in some cases, the expansion modules 104 may include a user interface including a display and a means for receiving user input (e.g., touch screens, buttons, keyboards, etc.). The memory 142 may be in communication with the controller 140. The memory 142 may be used to store any desired information such as, but not limited to, control algorithms, configuration protocols, set points, schedule times, diagnostic limits such as, for example, differential pressure limits, delta T limits, security system arming modes, and the like. The memory 142 may be any suitable type of storage device including, but not limited to, RAM, ROM, EPROM, flash memory, a hard drive, and/or the like. In some cases, the controller 140 may store information within the memory 142, and may subsequently retrieve the stored information from the memory 142. The expansion modules 104 may further include a base module database 144a, 144b, 144n (collectively, 144). The database 144 may be stored within in the memory 142 and contain data to provide to the base module 102 and/or data received from the base module 102. Each expansion module 104 may further include a system configuration module 146a, 146b, 146n. The system configuration module 146 may be configured to facilitate configuration of the modular control system 100, as will be described in more detail herein.

Figure 3:
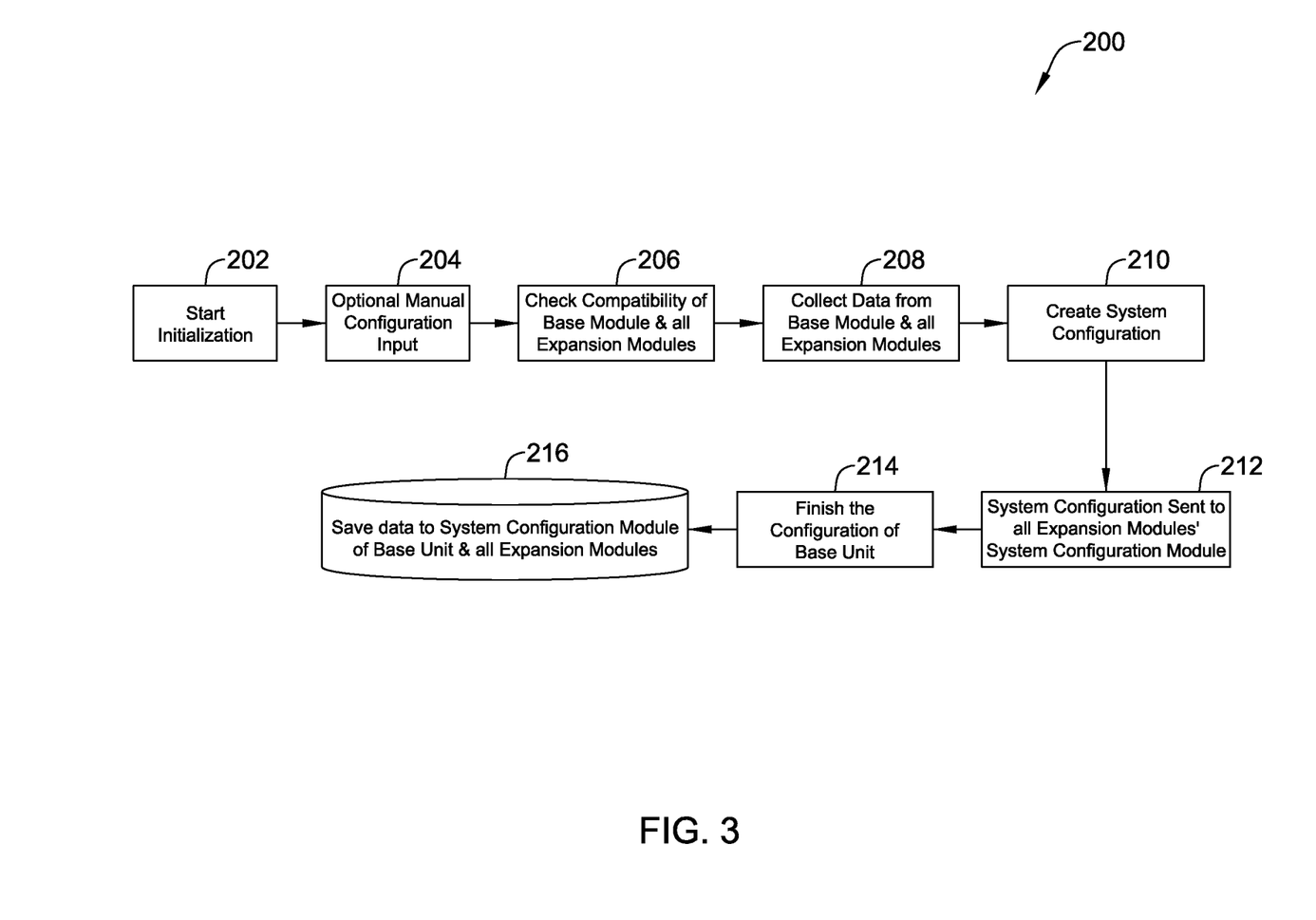
FIG. 3 is an illustrative method of automatically configuring the system of FIG. 2.

FIG. 3 is a flow chart of an illustrative method 200 for automatically configuring the modular control system 100, at least in part. It is contemplated that the method 200 may be performed before or after installation of the base module 102 and/or expansion modules 104, as desired. For example, the base module 102 and the expansion modules 104 may be capable of communicating over a network prior to installation in a building. This may allow the base module 102 and expansion modules 104 to be configured at the time of sale or at some point prior to installation in the building, although this is not required. To begin the configuration process, the base module 102 may receive a command to start initialization, as shown at block 202. For example, the initialization module 126 may receive a command to initialize the configuration mode. This may cause the base module to enter a configuration mode.

Once in the configuration mode, the base module 102 may be configured to solicit and receive information from a user, as shown at block 204. In some cases, the base module 102 may be configured to prompt a user to manually enter at least some of the information. For example, if the modular control system 100 is being configured at the time of sale, the user may be prompted to enter location information for each of the expansion modules 104 and/or product information regarding the expansion modules 104. This is just an example. The user may be prompted or required to enter other information including, but not limited to, control set points, information about the devices to be controlled, building size, building layout, etc. However, the solicitation for and manual input of information is not required. In some embodiments, this step may be omitted completely.

Either after the manual input of information (block 204) or after the initiation of the configuration mode (block 202), the base module 102 may send a request to the expansion modules 104 for identification. The base module 102 may store a list of the identified expansion modules 104 in a database in the memory 120. The base module 102 may then compare the list of expansion modules 104 to a list of expansion modules 104 that are compatible with the base module 102 to determine if the identified expansion modules 104 are compatible with the base module 102, as shown at block 206. It is contemplated that the compatibility check may be performed by the compatibility module 130, although this is not required. In some cases, the list of compatible expansion modules 104 may be stored within the compatibility module 130 of the memory 120. In other cases, the list may be stored in the external cloud server 116. It is contemplated that if the base module 102 determines that one or more of the expansion modules 104 are incompatible with the base module 102, the base module 102 may provide an alert. The alert may be an audible noise, an alphanumeric or plain text visual message, a haptic alert, etc. The alert may be provided at the base module 102 or to a remove device, as desired. It is contemplated that the compatibility check may occur later in the configuration process, if so desired.

The base module 102 may then send a request to the expansion modules 104 to send additional information to the base module 102, as shown at block 208. It is contemplated that the data collection may be performed and/or stored within the data collection module 132, although this is not required. In some cases, the request for identification and/or the request for additional information may command or cause the expansion modules 104 to also enter a configuration mode. The base module 102 may automatically (e.g., without specific user input) collect functional and/or technical information or parameters from the expansion modules 104. The technical parameters of the expansion modules 104 may include product identification information (such as, but not limited to, a make, model, serial number, etc.), a function list (such as, but not limited to, a list of function performed by the expansion module), and/or a function interface (such as, but not limited to, how to access the function). The functional parameters may include an IP address of the expansion module, a physical location of the module (e.g., where it is or is to be located within the building to be controlled), and/or a sensor reading or type of sensor reading (e.g., in the case of an HVAC system: temperature, humidity, etc.). These technical and functional parameters are merely exemplary and are not intended to limit the data collection to only these parameters. It is further contemplated that the base module 102 may also query itself for relevant information. Both the automatically collected information and the manually collected information may be stored in the memory 120 of the base module 102 and/or in the data collection module 132, for example, in a database.

Once the information has been collected, the base module 102 may, at least in part, create a system configuration, as shown at block 210. This may be performed by the system configuration module 134, the manual system configuration module 136, or by both the system configuration module 134 and the manual system configuration module 136, although this is not required. The system configuration may include configuration parameters, control algorithms, mapping of the base module and/or expansion modules 104 to specific components of the modular control system 100, generated control parameters, etc. However, in some cases, the base module 102 may transmit at least some of the collected information to the cloud server 116. Upon receipt of the information from the base module 102, the cloud server 116 may be configured to create at least part of the system configuration, at least in part, for the modular building control system 100 using the information collected from the base module 102 and the one or more expansion modules 104. The cloud server 116 may transmit the system configuration back to the base module 102. In some cases, the base module 102 may create part of the system configuration while the cloud server 116 may create another part of the system configuration. The configuration parameters for the base module 102 and/or the expansion modules 104 may be stored within the system configuration module 134 and/or the manual system configuration module 136.

In some cases, the configuration module 134 may use current sensor readings received from the expansion modules to determine the type of sensor. For example, the configuration module 134 can distinguish between a temperature sensor and a humidity sensor based on the current sensor reading and in some cases historical sensor readings (e.g. by the range and/or patterns in historical sensor readings). The configuration module 134 may determine a desired function and configuration of the expansion module based on the types of sensors connected to the expansion module, and/or on the functions of other of the expansion modules. For example, if it is determined that an expansion module is connected to 6 temperature sensors, and also has connection to six digital outputs, the configuration module 134 may determine that the expansion module is controlling six separate VAV boxes. This is just an example.

Once the system configuration is complete, the base module 102 may then transmit the system configuration, or at least the relevant portion of the system configuration, to each of the expansion modules 104, as shown at block 212. The system configuration may be received at the system configuration module 146 of the each of the expansion modules 104. The expansion modules 104 may then each save and install the system configuration and the respective configuration parameters thereon. Similarly, the base module 102 may install the system configuration and respective configuration parameters on itself. Once installation is complete, the base module 102 may finish the configuration mode by exiting the configuration mode, as shown at block 214. The base module 102 may also transmit a command to the expansion modules 104 for them to also exit the configuration mode. Upon exiting the configuration mode, the base module 102 and/or the expansion modules 104 may enter an operational mode. Once in the operation mode, the controller 118 of the base module 102 and/or the controllers 140 of the expansion modules 104 may control the modular control system 100 using the configuration. For example, the base module 102 and/or the expansion modules 104 may issue control commands to various building devices to effect control of the building control system. In some cases, the base module 102 and/or the expansion modules 104 may control HVAC devices, security system devices, lighting, fire systems, and/or access control systems. As indicated at block 216, the base module 102 may save all of the configuration information to the system configuration module 134 and/or the manual system configuration module 136 and/or the system configuration module 146 of the expansion modules 104.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for configuring a modular building control system that includes a plurality of building control components that are controlled by a base module and one or more expansion modules, wherein the base module is a master control device that is operatively coupled to the one or more expansion modules and is configured to provide instructions to one or more of the expansion modules, which in turn, are configured to provide control commands for controlling an operation of one or more of the building control components of the modular building control system, the base module including one or more wiring terminals for receiving control wires from one or more of the building control components, and each of the one or more expansion modules including one or more wiring terminals for receiving control wires from one or more of the building control components, the method comprising:

entering a configuration mode in the base module;

entering a configuration mode in each of the one or more expansion modules;

while both the base module and each of the one or more expansion modules are in their respective configuration modes, the base module sending a request to each of the one or more expansion modules to request information from each of the one or more expansion modules, and in response, each of the one or more expansion modules sending the requested information to the base module;

creating a system configuration for the modular building control system based at least in part on the requested information, the created system configuration including:

a mapping of the base module and/or one or more of the expansion modules to specific building control components of the modular building control system;

configuration parameters for the base module and each of the one or more expansion modules in accordance with the mapping;

the base module transmitting at least a relevant portion of the system configuration to each of the one or more expansion modules to configure each of the one or more expansion modules in accordance with the system configuration;

the base module and each of the one or more expansion modules installing their respective portion of the system configuration;

the base module and each of the one or more expansion modules exiting their respective configuration mode and entering an operation mode; and while in the operation mode, the base module and each of the one or more expansion modules controlling the modular building control system in accordance with the system configuration.

2. The method of claim 1, further comprising:

checking a compatibility of the base module and each of the one or more expansion modules; and providing an alert when an incompatibility is detected.

3. The method of claim 1, wherein requesting information from each of the one or more expansion modules comprises requesting technical parameters of each of the one or more expansion modules.

4. The method of claim 3, wherein the technical parameters comprise one or more of an expansion module product identification, an expansion module function list, and/or an expansion module function interface.

5. The method of claim 1, wherein requesting information from each of the one or more expansion modules comprises requesting functional parameters of each of the one or more expansion modules.

6. The method of claim 5, wherein the functional parameters comprise one or more of an IP address of an expansion module, a physical location of an expansion module, and/or a sensor reading.

7. The method of claim 1, wherein creating the system configuration is performed at least in part by the base module.

8. The method of claim 1, further comprising transmitting the requested information from the base module to a cloud server, and wherein creating the system configuration is performed at least in part by the cloud server.

9. The method of claim 1, wherein the modular building control system comprises a Heating, Ventilation, and Air Conditioning (HVAC) system.

10. The method of claim 1, wherein the modular building control system comprises a security system.

11. The method of claim 1, wherein at least some of the requested information is manually specified by a user.

12. The method of claim 1, wherein at least some of the requested information is automatically collected by the base module.

13. A system for configuring a modular building control system of a building, the system comprising:

a base module including a controller, a memory, and a communications interface;

one or more expansion modules in communication with the base module via the communication interface, each of the one or more expansion modules including one or more wiring terminals for receiving control wires from one or building control components of the modular building control system;

wherein the controller of the base module is configured to enter a configuration mode, and once in the configuration mode:

request information from each of the one or more expansion modules via the communication interface;

store a system configuration for the modular building control system that is based at least in part on the requested information, the system configuration including:
  a mapping of the base module and/or one or more of the expansion modules to specific building control components of the modular building control system;
  configuration parameters for the base module and each of the one or more expansion modules that are in accordance with the mapping;
transmit at least a relevant portion of the system configuration to each of the one or more expansion modules to configure each of the one or more expansion modules in accordance with the system configuration;
install a respective portion of the system configuration for the base module on the base module;
exit the configuration mode and entering an operational mode;
once in the operational mode, the controller of the base module controlling in conjunction with the one or more expansion module the modular building control system in accordance with the system configuration.

14. The system of claim 13, wherein the controller of the base module is configured to:
check a compatibility of the base module and each of the one or more expansion modules; and
provide an alert when an incompatibility is detected.

15. The system of claim 13, wherein the controller of the base module is configured to send a command to each of the one or more expansion modules to place each of the one or more expansion modules in a configuration mode before receiving the requested information from each of the one or more expansion modules.

16. The system of claim 15, wherein the controller of the base module is configured to send a command to each of the one or more expansion modules to place each of the one or more expansion modules in an operation mode before controlling in conjunction with the one or more expansion modules the modular building control system in accordance with the system configuration.

17. The system of claim 13, wherein the information comprises at least one parameter from each of the one or more expansion modules, wherein the at least one parameter includes one or more of a product identification, a function list, a function interface, an IP address, a location, and/or a sensor reading.

18. The system of claim 13, wherein the controller of the base module is configured to transmit at least some of the received information from the base module to a cloud server, and to receive at least in part of the system configuration from the cloud server.

19. A system for configuring a modular building control system of a building, the system comprising:
a base module including a controller, a memory, and one or more communications interfaces;
one or more expansion modules in communication with the base module via the communication interface, each of the one or more expansion modules including one or more wiring terminals for receiving control wires from one or more building control components of the modular building control system;
a cloud server in communication with the base module;
the controller of the base module is configured to:
  collect information from the base module and the one or more expansion modules; and
  transmit at least some of the collected information to the cloud server;
wherein upon receipt of the information from the base module, the cloud server is configured to create a system configuration for the modular building control system using the information collected from the base module and the one or more expansion modules, and to transmit the system configuration to the base module, the system configuration including:
  a mapping of the base module and/or one or more of the expansion modules to specific building control components of the modular building control system;
  configuration parameters for the base module and each of the one or more expansion modules that are in accordance with the mapping;
the controller of the base module is configured to transmit at least a relevant portion of the system configuration to each of the one or more expansion modules;
the controller of the base module is configured to install a respective portion of the system configuration for the base module on the base module;
each of the one or more expansion modules is configured to install their respective portion of the system configuration; and
once the base module and each of the one or more expansion modules have installed their respective portion of the system configuration, the controller of the base module is configured to control in conjunction with the one or more expansion modules the modular building control system in accordance with the system configuration.

20. The system of claim 19, wherein the cloud server is further configured to check a compatibility of the base module and each of the one or more expansion modules and provide an alert when an incompatibility is detected.

* * * * *